3,552,991
TRANSFER PAPER
George R. E. Daniels, Boston, Mass., assignor to The Carter's Ink Company, Cambridge, Mass., a corporation of Massachusetts
No Drawing. Filed May 1, 1967, Ser. No. 634,921
Int. Cl. B41m 5/10
U.S. Cl. 117—36.1          3 Claims

ABSTRACT OF THE DISCLOSURE

A pencil carbon paper is formed from a transfer coating comprising a vinylidene chloride polymer and polyvinyl acetate with a transfer ink having a sperm oil medium.

---

This invention relates to carbon paper and in particular to carbon paper for use with a hand writing instrument, the type commonly referred to as "pencil carbon."

Carbon papers used to be generally formed with a transfer coating composition comprising wax, oil and coloring ingredients. More recently there have been used transfer coatings formed of a solution of a thermoplastic resin containing colorants dissolved or dispersed in nonvolatile, nondrying oils. These have become known generally as either plastisol or solvent type coatings as distinguished from the wax base coatings which are generally applied as a hot melt.

The object of this invention is to provide a solvent type carbon paper of superior transfer characteristics as a pencil carbon. Specifically, the carbon paper of this invention is formed with a transfer coating having superior clinch (or tenacity of adherence) characteristics while being sufficiently soft for pencil use, without excessive inkiness. The marking characteristics are such that while the paper is responsive to the relatively light pressure of pencil writing, the transfer of colorant occurs fractionally to provide for long wear and minimal density reduction under repeated usage, and excessive smudgeness is avoided.

The transfer composition of this invention is based on a combination of a vinylidene chloride polymer containing at least 60 percent by weight of vinylidene chloride and a vinyl acetate polymer, the latter being present to the extent of about 12 to 40 percent by weight of the total resin content.

The colorant in the transfer coating is based on sperm oil in an amount of between about 1.5 to 2 times the weight of the total resin content.

The following examples illustrate the preferred embodiment of this invention.

| (A) Resin solution: | PBW |
|---|---|
| Methyl Ethyl Ketone | 79.96 |
| Toluol | 6.85 |
| Dow Saran Resin F220 | 11.09 |
| Airco B–15 Resin | 2.10 |
| | 100.00 |

| (B) Paste (colorant): | |
|---|---|
| Deodorized Stabilized Sperm Oil | 63.79 |
| CP Blue Toner Pigment (Iron Blue) | 17.44 |
| Alkali Blue R | 17.44 |
| Parisian Red or Pigment Scarlet | 1.37 |
| | 100.00 |

| (C) Coating formula: | |
|---|---|
| Resin Solution (A above) | 74.33 |
| Paste (B above) | 25.67 |
| | 100.00 |

The resin solution is first formed by dissolving the resins in the solvent components.

The colorant paste is formed by mixing the pigments and colorants with the sperm oil and ball-milling until a smooth paste is formed. The resin solution A and paste B are then mixed until the mixture is of coatable consistency. The transfer composition thus formed is then applied to a paper base, e.g., a sulfite paper weighting 12 pounds per ream (500 sheets 20" x 30") in the usual manner (e.g., by reverse roll coating) and allowed to dry.

In the foregoing examples:

Saran F220 is a vinylidene chloride-acrylonitrile copolymer of 80:20 composition. Soluble in ketones, and tetrahydrofuran nonsoluble in hydrocarbon solvents (i.g., toluene, xylene, benzene).

Airco B–15 is a polyvinyl acetate polymer of 60,000 molecular weight with a softening point of 105° C.

The pencil carbon paper formed in accordance with this example is of superior characteristics with respect to clinch, long wear, and short density droppage as compared with previously known pencil type carbons which have generally been based on mixtures of vinyl chloride and acrylic polymers. In addition, the copies formed by the foregoing examples are reproducible by thermal copying processes such as Thermofax, because of the presence of the Iron Blue.

The proportion of materials may be varied to modify the transfer properties. The polyvinyl acetate content may be increased to allow deeper manifolding in which case the amount of paste relative to the amount of resin should be correspondingly reduced to give a nonoily surface. A less pressure responsive coating is provided by increasing the vinylidene chloride polymer content in relation to the polyvinyl acetate.

Other modifications will readily occur to those skilled in the art and familiar with the principles herein set forth, and variations may be made without departing from the scope of this invention. In particular, other solvents and other colorants may be employed depending on the results desired. The proportion of solids to solvent in the resin solution is selected to provide a mixture of coatable consistency, and may be varied depending on the coating method and on the particular solvents employed. The amount of colorant paste in the mixture may also be varied, e.g., down to about 20 percent by weight, depending on the desired density of the coating.

Having thus disclosed my invention and described in detail a preferred embodiment thereof, I claim and desire to secure by Letters Patent:

1. A carbon paper comprising a base sheet and a transfer coating on one side of said base sheet, said transfer coating comprising a vinylidene chloride polymer containing at least about 60 percent by weight of vinylidene chloride, and polyvinyl acetate, said acetate comprising between about 12 and 40 percent by weight of the total resin, said vinylidene chloride polymer being substantially the balance of the total resin and a colorant comprising sperm oil, the weight of sperm oil being between about 1.5 and 2 times the weight of total resin.

2. A carbon paper as defined by claim 1 wherein the vinylidene chloride polymer and polyvinyl acetate are present in relative proportions of about 11:2.

3. A carbon paper as defined by claim 1 wherein the colorant contains CP Blue Toner Pigment.

References Cited

UNITED STATES PATENTS

| 2,944,037 | 7/1960 | Clark | 117—36.1 |
| 2,989,493 | 6/1961 | Clark | 117—36.1 |
| 3,037,879 | 6/1962 | Newman et al. | 117—36.1 |

MURRAY KATZ, Primary Examiner

U.S. Cl. X.R.

117—155; 260—23